US00RE34316E

United States Patent [19]

Katogi et al.

[11] E Patent Number: Re. 34,316

[45] Reissued Date of Patent: Jul. 20, 1993

[54] IGNITION TIMING CONTROL APPARATUS FOR AN INTERNAL COMBUSTION ENGINE

[75] Inventors: Kozo Katogi, Hitachi; Asahiko Otani, Tondabayashi, both of Japan

[73] Assignee: Hitachi, Ltd., Tokyo, Japan

[21] Appl. No.: 660,853

[22] Filed: Feb. 26, 1991

Related U.S. Patent Documents

Reissue of:

[64] Patent No.: 4,913,116
Issued: Apr. 3, 1990
Appl. No.: 319,726
Filed: Mar. 7, 1989

[30] Foreign Application Priority Data

Mar. 10, 1988 [JP] Japan ..... 63-54809

[51] Int. Cl.[5] ..... F02P 5/15

[52] U.S. Cl. ..... 123/425; 123/435

[58] Field of Search ..... 123/416, 417, 425, 435, 123/179 BG, 179.5

[56] References Cited

U.S. PATENT DOCUMENTS

| | | | |
|---|---|---|---|
| 4,594,982 | 6/1986 | Takahashi et al. | 123/425 |
| 4,612,901 | 9/1986 | Iwata et al. | 123/425 |
| 4,630,584 | 12/1986 | Higashiyama et al. | 123/425 |
| 4,635,604 | 1/1987 | Iwata et al. | 123/425 |
| 4,715,342 | 12/1987 | Nagai | 123/425 |
| 4,729,358 | 3/1988 | Morita et al. | 123/425 X |
| 4,947,817 | 8/1990 | Ido | 123/425 |

FOREIGN PATENT DOCUMENTS

| | | | |
|---|---|---|---|
| 0217773 | 12/1983 | Japan . | |
| 0258953 | 11/1986 | Japan | 123/425 |
| 0058057 | 3/1987 | Japan . | |
| 0107274 | 5/1987 | Japan . | |
| 0080071 | 4/1988 | Japan | 123/425 |

*Primary Examiner*—Willis R. Wolfe
*Attorney, Agent, or Firm*—Antonelli, Terry, Stout & Kraus

[57] ABSTRACT

There are provided a first ignition timing table for high-octane fuel and a second ignition timing table for low-octane fuel. When the second table is switched over to the first table, there is at first the difference in between basic ignition timings according to the first and second tables, and then the difference is reduced with time at a constant rate. An actual ignition timing during the switchover of an ignition timing table is determined by subtracting the reducing difference from the basic ignition timing according to the first table. The actual ignition timing when knocking is detected is compared with a predetermined threshold. If the former exceeds the latter, the second table is switched over to the first table, and otherwise the second table is maintained, whereby the actual ignition timing can be changed smoothly even during the switchover of an ignition timing table.

18 Claims, 6 Drawing Sheets

REF

INPUT OF COMPARATOR
BGL
SIG

KNOCKING SIG.

CONTENT OF COUNTER

IGNITION TIMING ($\theta_{IGN}$)
$\theta_I$ (INTEGRATION COMP.)
$\theta(N,L)$
$\theta_R$ (PROPORTIONAL TO n)
0

IGNITION SIG.
PROPORTIONAL TO $\theta_R$

IGNITION TIMING CONTROL APPARATUS FOR AN INTERNAL COMBUSTION ENGINE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an ignition timing control apparatus for an internal combustion engine using an ignition timing table, and especially to an electronic ignition timing control apparatus suitable for an automobile gasoline engine, which can be supplied with fuel having the different knocking-resistant characteristics.

2. Description of the Prior Art

In an internal combustion engine, such as a gasoline engine, it is preferable to make the engine operate at the ignition timing advanced almost up to the limit of occurrence of knocking, in the point of view of full use of its performance. If, however, the ignition timing is fixed at such a limit value, the stable operation can not be always obtained due to the small change in the engine characteristics or the variance in the quality of fuel, with the result that knocking often occurs and the performance of the engine falls.

The frequent occurrence of knocking reduces the span of life of an engine. In an extreme case, an engine comes to be broken down. Therefore the occurrence of knocking must be prevented to the utmost, especially in an engine with a so-called turbo-charger. Then, there is recently used a knocking control system, in which the occurrence of knocking is detected and the ignition timing is controlled by the feed-back control on the basis of a knocking detection signal, whereby it becomes possible to always operate an engine at the ignition timing near the limit of occurrence of knocking.

In the conventional knocking control system, the occurrence of knocking was detected by a knocking detector disclosed in the laid-open Japanese patent application JP-A-58/217773 (1983), for example. According thereto, a sensor, which is a kind of an acceleration detector, is attached to an engine block to detect the vibration of an engine. Since the vibration of an engine includes harmonics extending over the considerably wide range of frequencies, components including only harmonics of frequencies, e.g., 6 to 8 KHz, which are said to be inherent to the knocking phenomenon of an engine, are extracted from the output signal of the sensor by a band-pass filter.

The output signal of the band-pass filter is amplified to form a vibration signal SIG having a predetermined level, on one hand, and is subject to the half-wave rectification and smoothed to form a background level signal BGL, on the other hand (cf. FIG. 1b). The thus obtained signals are compared with each other, and when the former signal exceeds the latter one, a pulse signal is produced. Therefore, a knocking detection signal of the knocking detector becomes a pulse train signal (cf. FIG. 1c), and the number of pulses within a constant period indicates the intensity of the occurring knocking. The constant period is defined by a reference signal REF generated at every predetermined rotational angle of an engine crank shaft (cf. FIG. 1a).

The conventional knocking control system carries out the following control operation by using the knocking detection signal as mentioned above. There is provided a counter, which counts pulses of the knocking detection signal and is cleared by the reference signal. Every time when the counter is cleared, the content thereof is taken, because the content just before the clear of the counter represents the intensity of knocking (cf. FIG. 1d).

The amount $\theta_R$ of an ignition delay angle is proportion to the detected intensity n of knocking is read out from an ignition control table, which is provided in advance. The aforesaid amount $\theta_R$ is called a proportional component. The ignition timing at that time, which is given as a basic ignition timing $\theta$(N,L), is delayed by the proportional component $\theta_R$ to obtain a actual ignition timing $\theta_{IGN}$. After that, the actual ignition timing $\theta_{IGN}$ is returned again toward the basic ignition timing $\theta$(N,L) with time at a predetermined rate $\theta_I$(cf. FIG. 1e). This rate $\theta_I$ is called an integration component. Therefore, an overall correction amount $\theta_{KN}$ is represented by $(\theta_R+\theta_I)$. As a result, an ignition signal is produced at the time point which is delayed by an angle corresponding to $\theta_R$ from a time point according to $\theta$(N,L) (cf. FIG. 1f).

According to this control system, when the occurrence of knocking is detected, the ignition timing is delayed at once in accordance with the intensity of the occurring knocking, whereby the occurrence of knocking is effectively suppressed, and an engine can show its full performance.

As is well known, however, the occurrence of knocking in a gasoline engine greatly depends on the octane value of fuel. Generally, knocking is easy to occur with low-octane gasoline and difficult to occur with high-octane gasoline. In order to effectively suppress the occurrence of knocking, therefore, an engine has to be controlled, taking account of the nature of fuel, such as octane value thereof.

Then, in a conventional engine control apparatus, it was supposed that an engine is operated with the constant nature of fuel, and various data necessary for the engine control, including data for controlling the ignition timing, were provided in advance on the basis of the supposed nature of fuel. If, therefore, an engine is supplied sometimes with low-octane gasoline and sometimes with high-octane gasoline, the precondition provided in view of the constant nature of fuel is destroyed and an undesirable influence appears on the performance and durability of the engine.

In addition thereto, there was also the limit in coping with uncontrollable factors, such as aged deterioration. From those reasons, the conventional engine control apparatus was difficult to always maintain the ignition timing at an appropriate value commensurate with the characteristics of an engine.

To solve the problem as mentioned above, there is proposed an ignition timing control apparatus, as disclosed in the laid-open Japanese patent application JP-A-62/58057 (1987), for example. Accordingly to this, there are prepared in advance a plurality of different tables for the ignition timing control, which have different data in response to the nature of fuel and the change in the engine characteristics. An adaptive ignition timing table is selected from among them in accordance with the degree of occurrence of knocking, and the ignition timing control is carried out by using the selected table.

In practice, however, there does not always appear the significant difference in the intensity of knocking occurring when an engine is operated with fuel of the different octane value. The intensity of knocking differs every engine because of the difference in the operational condition and the aged deterioration. Therefore, a threshold for judging the occurrence of knocking to accordingly select an adaptive one of ignition timing tables had to be set at a different level for every engine. It was difficult to determine a threshold level, which can be used in common for every engine. As a result, a common threshold level had to be set rather high so as not to erroneously judge the occurrence of knocking.

Further, in the prior art apparatus, no consideration was given to the ignition timing control at the time of switchover of an ignition timing table, with the result that knocking caused by the abrupt change of an ignition timing table could not be prevented from occurring. Moreover, since a threshold level was set rather high, there was the danger that knocking becomes always hard, when it occurs, whereby a serious damage is applied to an engine.

Additionally, if an ignition timing table for low-octane fuel is selected, notwithstanding an engine is actually supplied with high-octane fuel, the knocking scarcely occurs in the engine. In such a case, an ignition timing table was never switched over in the prior art apparatus, because it had no function for judging the octane value of fuel used. Therefore, the engine could not show its full performance commensurate with the fuel used at that time, as well as the effect of plural ignition timing tables specially provided could not be obtained.

SUMMARY OF THE INVENTION

An object of the present invention is to provide an ignition timing control apparatus, which has plural ignition timing tables capable of being switched over in response of the octane value of fuel used and can always provide the smooth change in the ignition timing even during the switchover of an ignition timing table.

A feature of the present invention resides in an ignition timing control apparatus for an internal combustion engine, which is provided with plural tables for providing basic ignition timings, selects one of the plural tables on the basis of a knocking detection signal produced by a knocking sensor and determines a final ignition timing to be actually used in accordance with the selected ignition timing table, characterized in that the plural ignition timing tables includes a first ignition timing table for high-octane fuel and a second ignition timing table for low-octane fuel, and when one of the first and second tables is switched over to the other table, the switchover of an ignition timing tables is carried out in such a manner that: a difference between basic ignition timings according to the first and second tables is obtained and reduced with time at a predetermined constant rate; a basic ignition timing according to the one table is corrected by the reducing difference so that if the reducing difference is zero, the final ignition timing is equal to a basic ignition timing according to the other table; the reducing difference is compared with a certain threshold; and it is determined whether the one table is to be maintained or switched over to the other table in accordance with the comparison result.

According to the present invention, even if knocking occurs, it can be suppressed during light knocking until it does not become hard, as well as the ignition timing is changed smoothly even during the switchover of an ignition timing table.

In the present invention, if an engine is always started according to the second table, knocking can be suppressed, even if the engine is supplied with any kind of fuel, i.e., low-octane fuel or high-octane fuel, and since the switchover operation of an ignition timing table is always initiated, there never occurs such a case that the second table continues to be used, notwithstanding high-octane fuel is actually used.

Further, if knocking occurs during the switchover of an ignition timing table to the first table, it can be returned again to the second table in accordance with the actual ignition timing at the time. Therefore, it becomes possible to set an appropriate ignition timing table in response to the octane value of fuel used.

BRIEF DESCRIPTION OF THE DRAWINGS

[FIG. 8 is a]

DETAILED DESCRIPTION OF THE EMBODIMENT

In the following, the explanation will be made of an embodiment of the present invention, referring to the accompanying drawings.

Figures 1A, 1B, 1C, 1D, 1E, 1F:
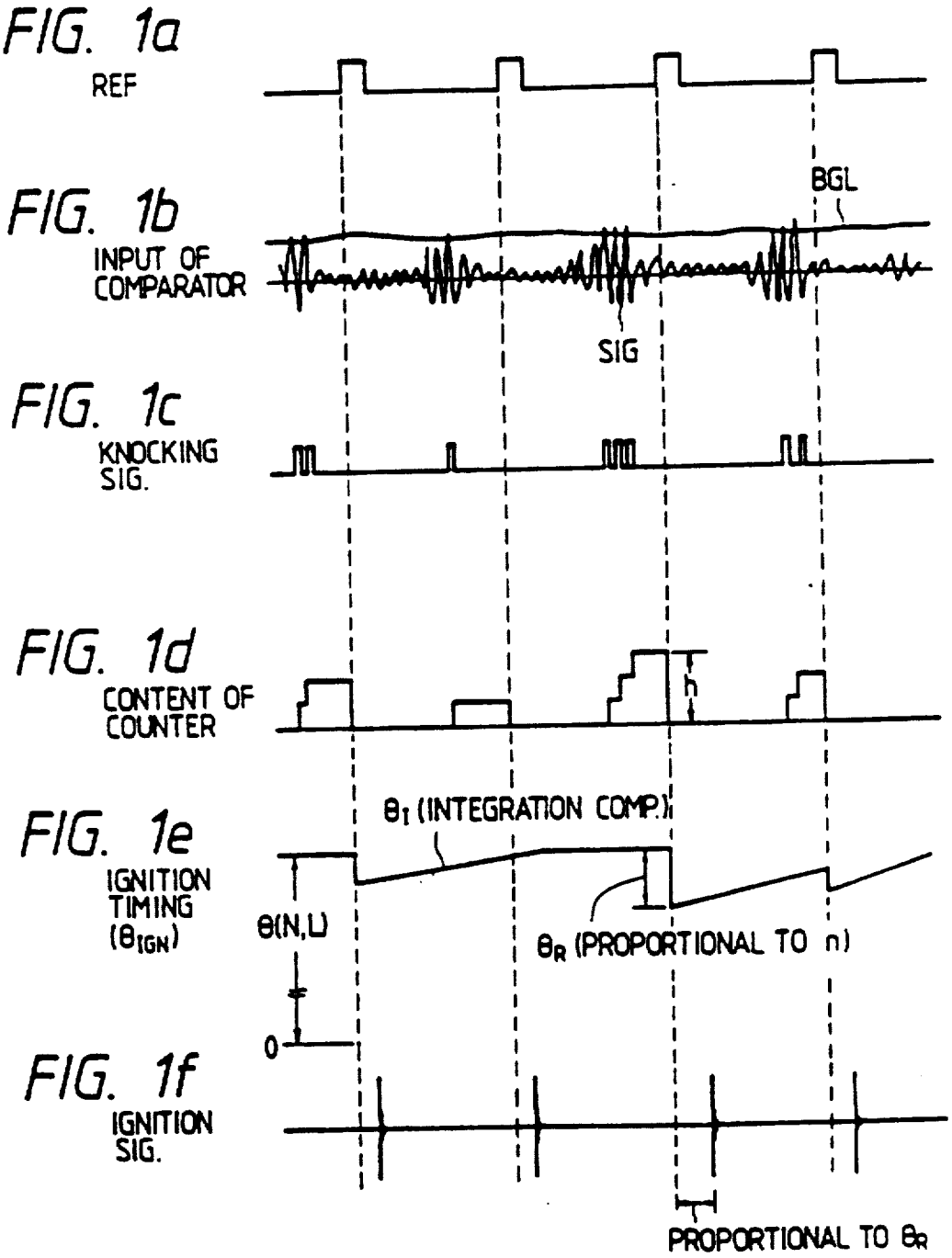
FIGS. 1a to 1f are drawings for explaining the operation of a conventional knocking control operation.
Figure 2:
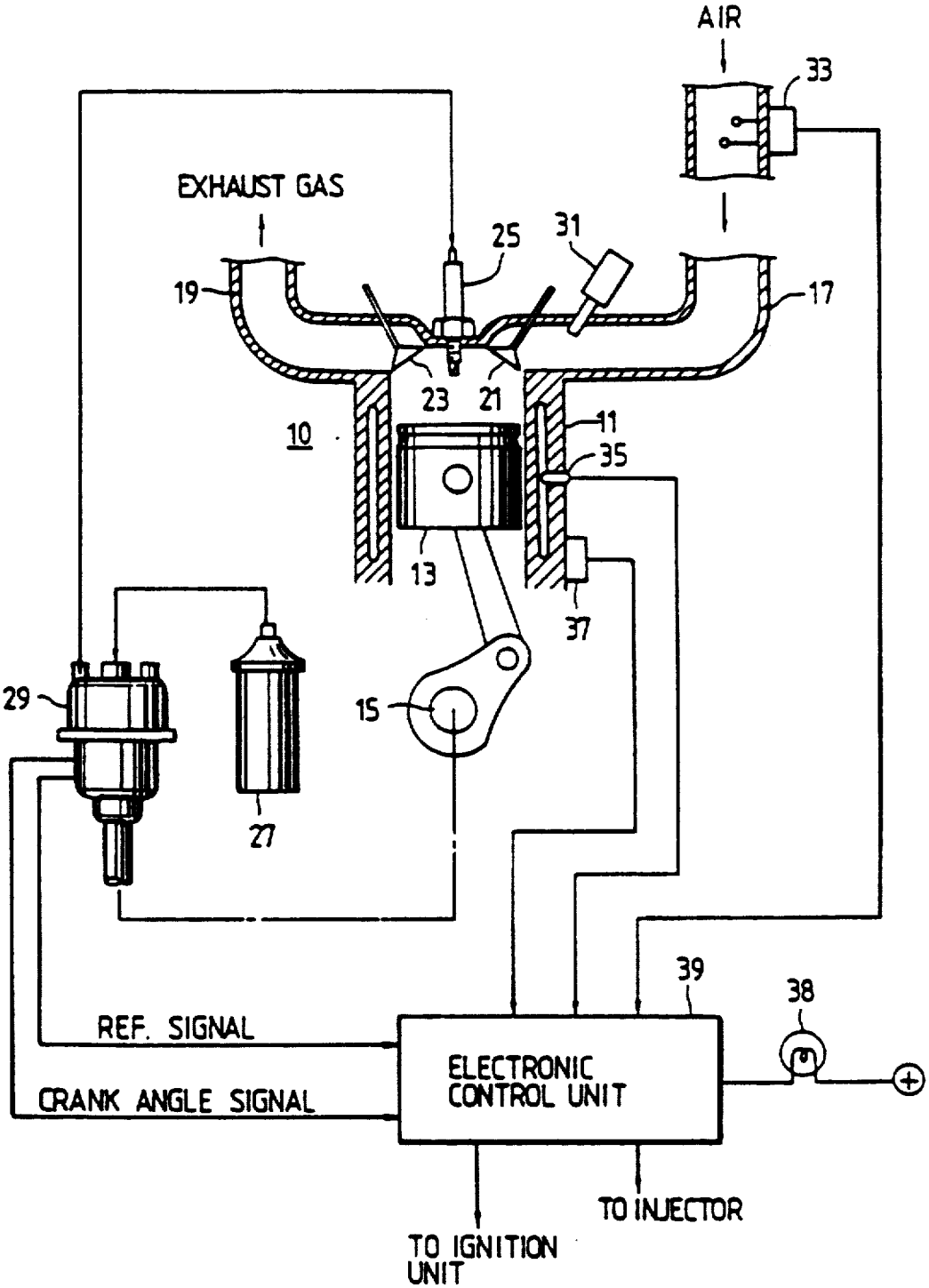
FIG. 2 schematically shows the arrangement of an engine control apparatus, which includes an ignition timing control apparatus according to an embodiment of the present invention.

Referring at first to FIG. 2, there is schematically shown an arrangement of an engine control apparatus, in which an ignition timing control apparatus according to an embodiment of the present invention is incorporated. In the figure, as far as an engine itself [concerns,] *is concerned,* there are shown only the parts thereof, which have close relation to the essence of the present invention.

Namely, in FIG. 2, internal combustion engine 10 is schematically shown with only one cylinder 11. Within the cylinder 11, piston 13 continues the reciprocating movement to rotate a crank shaft 15. A combustion chamber defined by the inner wall of the cylinder 11 and the piston 13 is communicated with intake pipe 17 and exhaust pipe 19 through inlet valve 21 and outlet valve 23, respectively.

The engine 10 is provided with a spark plug 25, to which a high voltage is applied by ignition unit 27 through distributor 29. The distributor 29 is mechanically coupled with the crank shaft 15 to rotate synchronously therewith. Therefore, the distributor 29 can also provide a reference signal representing a reference position of the crank shaft 15 and a crank angle signal indicating a predetermined amount of the rotational angle thereof.

In the intake pipe 17, fuel injector 31 is provided in the [neighbor] *neighborhood* of the inlet valve 21. The injector 31 is supplied with fuel and injects a predetermined amount thereof into the intake pipe 17, which is sucked into the combustion chamber together with the intake air. Although the pressure of the fuel supplied to the injector 31 is regulated at a constant value by an appropriate fuel supply system, it is omitted in the figure.

The engine 10 is further provided with various sensors for detecting operational parameters indicative of the operating state of the engine 10. In the intake pipe 17, there is [equipped] *an* airflow sensor 33 for measuring the amount of air sucked into the combustion chamber. To a wall of the cylinder 11, there are attached temperature sensor 35 for detecting the temperature of cooling water of the engine 10 and knocking sensor 37 capable of detecting the occurrence and intensity of knocking.

Output signals of those sensors are coupled to electronic control unit 39. There are further supplied for the control unit 39 the reference signal and the crank angle signal provided from the distributor 29. The control unit 39 includes a processor, which is well known in this field and composed of a central processing unit (CPU) for executing a predetermined processing, a read-only memory (ROM) for storing a program of the processing executed by CPU as well as various parameters and variables and a random access memory (RAM) for temporarily storing detected quantities or processed results, which are all coupled with each other by an internal bus line.

The processor in the control unit 39 receives the input signals as mentioned above through appropriate interface and executes a predetermined processing operation to produce control signals to the ignition unit 27 and the injector 31. Although, as is well known, the processor executes various kinds of processing operations, such as the fuel injection control, the ignition timing control and so on, only the ignition timing control operation, to which the present invention relates, will be explained in the following. Further, reference numeral 38 denotes an indicator, which is coupled to the control unit 39 and, as will be described later, turned on when fuel of bad quality is used.

Figure 3:
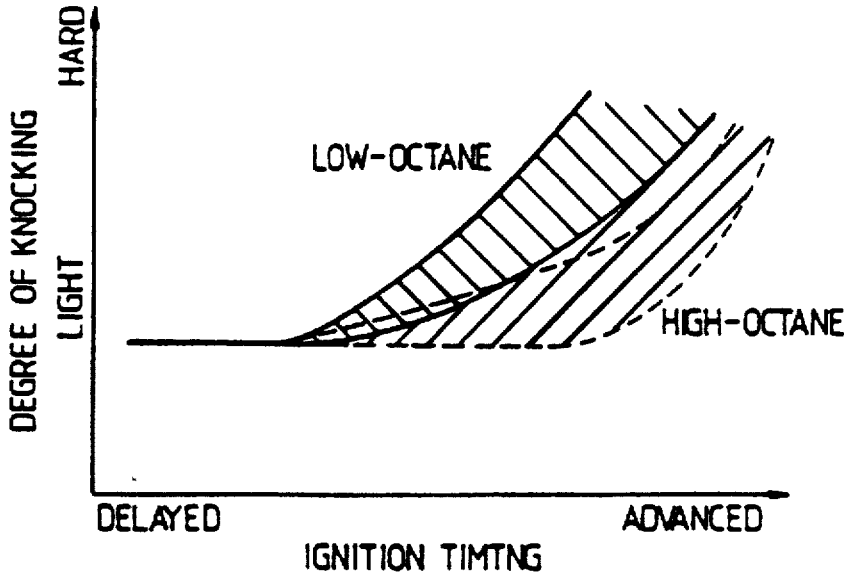
FIG. 3 is a graph showing the relation between the degree of occurring knocking and the ignition timing.

As is well known, knocking can occur at various ignition timing in accordance with the octane value of the fuel used. Further, as shown in FIG. 3 if the octane value of the fuel used is high, the amount of ignition angle capable of being advanced till the limit of occurrence of knocking becomes large as much. This amount of the advanced angle varies in response to the temperature of intake air and the aged deterioration, as well as the operational condition of an engine, and therefore the partially overlapping portion occurs between low-octane fuel and high-octane fuel, as shown in FIG. 3.

In order to be able to detect the occurrence of knocking in every kind of fuel, i.e., high-octane fuel or low-octane fuel, there must appear the significant and distinctive difference in the degree of knocking occurring under the different kinds of fuel used. Conventionally, however, because of the overlapping portion as mentioned above, the occurrence of knocking could be hardly detected during light knocking, and therefore knocking became always hard. As a result, there were not a few cases where an engine is broken down.

Then, in the present embodiment, the change of the ignition timing at the time of switchover of an ignition timing table is made smooth, whereby the occurrence of knocking can be detected during light knocking. An adaptive ignition timing control table is selected and switched over in response to the knocking detected during its light state.

In the present embodiment, there are prepared in the processor included in the control unit 39 two kinds of ignition timing tables, i.e., a first table for the advance angle characteristics for providing the ignition timing suited for high-octane fuel and a second table for the delay angle characteristics for providing the ignition timing suited for low-octane fuel. The selection and switchover between the two tables are executed by the processor within the control unit 39, too.

Figure 4A:
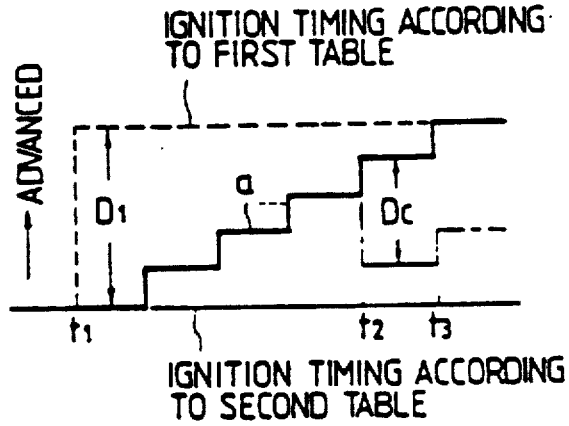
FIGS. 4a to 4c are drawings for explaining the operation of switchover of an ignition timing table according to the present embodiment.
Figure 4B:
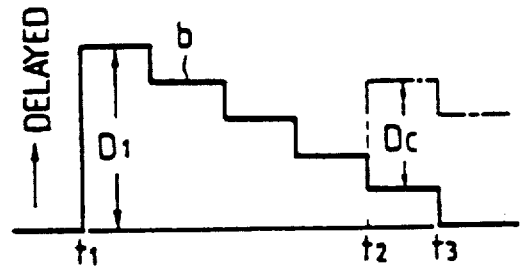
Figure 4C:
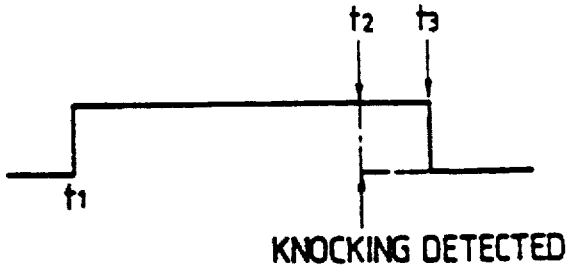
Figure 5:
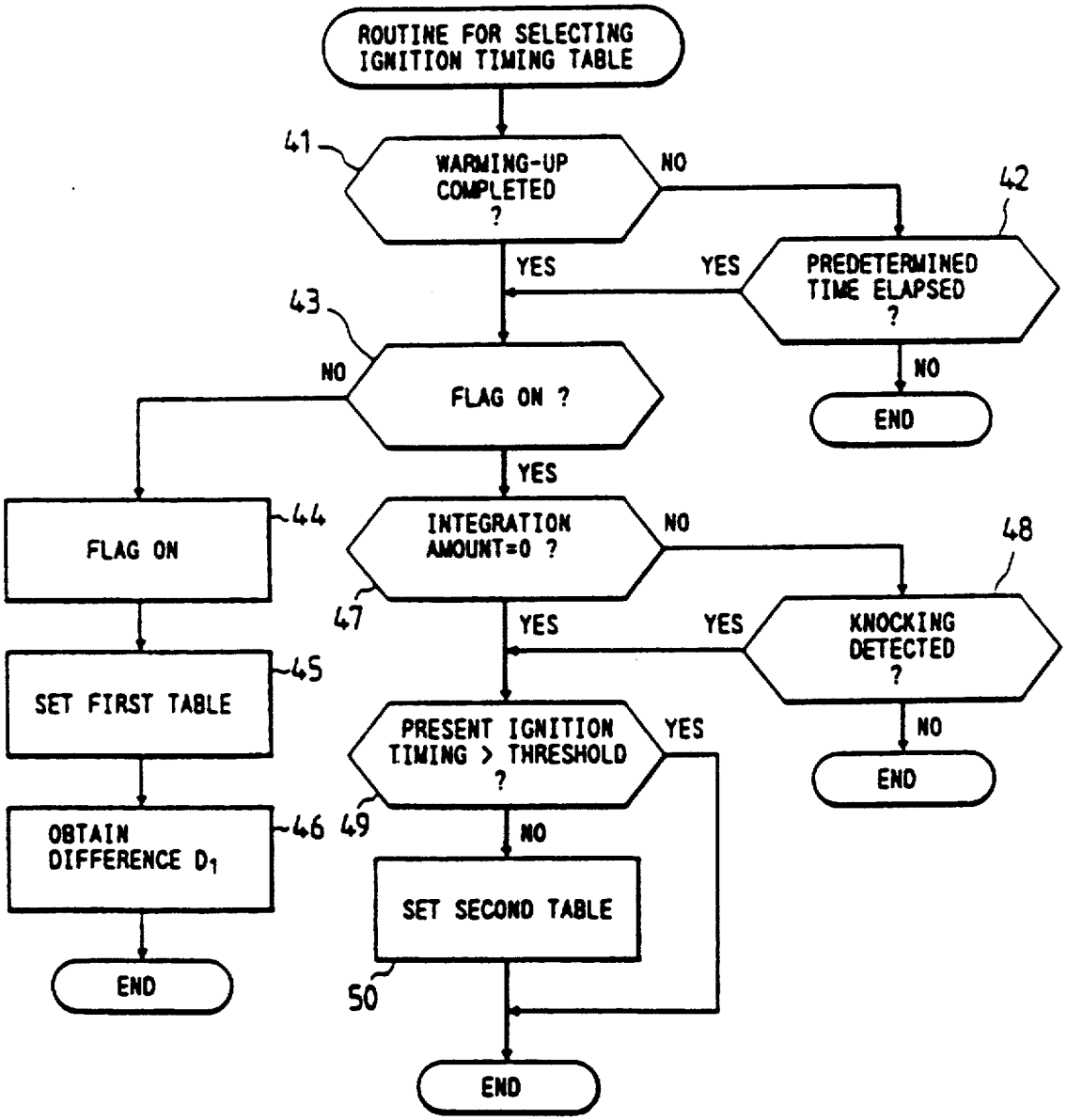
FIG. 5 is a flow chart showing of a routine for selecting an ignition timing table used in the embodiment.

In the following, the principle of the processing operation for aforesaid selection and switchover of an ignition timing table will be explained with reference to FIGS. 4a to 4c, before the explanation of a flow chart of this processing as shown in FIG. 5.

In the present embodiment, when an engine is started, the second table for the delay angle characteristics is at first selected, and this table is used during the warming-up operation of the engine, i.e., until the operation of the engine is stabilized at a predetermined operational condition. Namely, the ignition timing during the warming-up operation is determined by a basic ignition timing given by the second table.

Further, the aforesaid operational condition can be assumed to be, for example, a state that the temperature of a cylinder wall is around 70° C., the voltage of a buttery is maintained between 9 to 15 volts and an amount of intake air per one revolution of an engine with respect to one cylinder is larger than a predetermined value, and if these conditions are satisfied, it is discriminated that the warming-up of the engine is completed.

As shown in FIG. 4a, it is assumed that the warming-up operation of the engine is completed at time point $t_1$. When the time point $t_1$ is reached, the switchover operation of an ignition timing control table from the second table used until now to the first table for the advance angle characteristics is initiated. The first table is at first set, according to which a basic ignition timing as indicated by a broken line in FIG. 4a is given, and then the difference $D_1$ in the basic ignition timing between the first and second tables.

This difference $D_1$ is used for the purpose of determining a delay-angle correction amount for suppressing the knocking during the switchover operation of an ignition timing table. The difference $D_1$ is added to the initial value of an integration amount, which is zero in the case of FIG. 4b, and then decreased with time at a predetermined rate, as shown by a solid line in FIG. 4b.

An actual ignition timing finally used is determined by subtracting the thus obtained delay-angle correction, amount from the basic ignition timing determined by the first table. As a result, as shown by a solid line in FIG. 5a, the actual ignition timing successively changes from the basic ignition timing according to the second table toward that according to the first table at the predetermined rate during the switchover operation.

In the usual knocking control, there are many cases, where the predetermined rate is set at about 0.1° per one revolution of the engine in terms of a crank angle. With this value, however, the advancing rate of the ignition timing is too small. Then, in the present embodiment, a flag is raised at time point $t_1$, when the predetermined operational condition of the engine is satisfied, as shown in FIG. 4c, and during this flag is raised, the aforesaid rate is made as large as 1.0° per one revolution of the engine in terms of a crank angle. This flag is made off, when the knocking is detected again (cf. $t_2$ in FIG. [5c)] *4c)* or when the integration value is zero (cf. $t_3$ in the same).

If a predetermined time elapses from time point $t_1$ and the integration value becomes zero at time point $t_3$, because no knocking is detected the while, the fuel used at that time is judged as being of high-octane and therefore the first table continues to be used, and when time point $t_3$ is reached, the ignition timing between equal to the basic ignition timing given by the first table.

Figure 6:
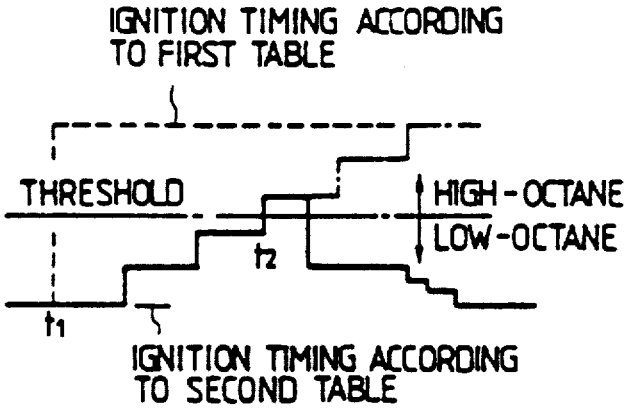
FIG. 6 is a drawing for explaining the operation of judgment of the octane value of fuel for switchover of an ignition timing table.

On the other hand, assuming that knocking is detected at time point $t_2$, before the integration amount becomes zero, the flag is at first made off, as shown by a chain line in FIG. 4c. Then, as shown in FIG. 6, the present actual ignition timing is compared with a predetermined threshold level. If it is beyond the threshold level on the side of the advanced ignition timing, the fuel used is judged as being of high-octane and the first table is maintained as the ignition timing table. On the contrary, if the present ignition timing remains below the threshold level, the fuel is judged as being of low-octane and the ignition timing table is returned to the second table again.

Figure 7:
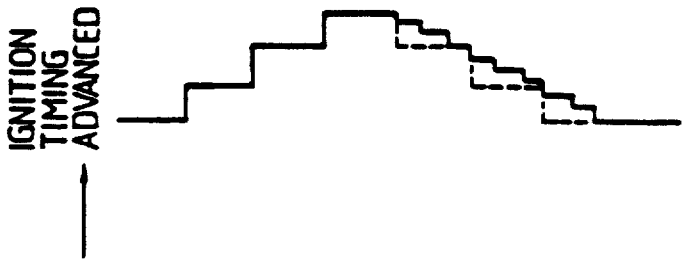
FIG. 7 is a drawing for explaining the operation of a digital filter additionally used in the embodiment.

As a result, the integration amount in this case changes at time point $t_2$ as shown by a chain line in FIG. 4b, and consequently the ignition timing changes as shown by a chain line in FIG. 4a. Further, if the actual ignition timing outputted in the form as shown in FIG. 4a is subject to a digital filter, the change in the actual ignition timing is smoothed, whereby the change in the ignition timing during the switchover operation of an ignition timing table can be further improved. Namely, as shown in FIG. 7, a calculated value (broken line) of the actual ignition timing is smoothed as shown by a solid line.

In this manner, the present embodiment can always judge the octane value of the fuel used at that time exactly, since the judgment is carried out on the basis of the threshold. Namely, assuming that the high-octane fuel is used at present, no knocking *will* usually occur during the period from time point $t_1$ to time point $t_3$, because the ignition timing still remains rather delayed for the high-octane fuel.

Even though knocking occurs during this period because of the change of the operational condition of an engine, noise or some other reasons, the integration amount ought to be considerably small at that time, and therefore it is impossible that the ignition timing at that time is lower than the threshold. Namely, the ignition timing at that time is to be very close to the basic ignition timing given by the first table. Therefore, the ignition timing table can be surely switched over to the first table.

As apparent from the foregoing, in the present embodiment, the judgment of the octane value is carried out on the basis of the integration amount, i.e., the ignition timing at that time, not by the intensity of knocking as in the conventional apparatus, knocking can be suppressed, during it still remains at the light level, even if low-octane fuel is used. Accordingly, there is no danger that an engine is damaged.

Moreover, in the present embodiment, the ignition timing smoothly changes even at the time of switchover of an ignition timing table. Consequently, no shock occur in an engine.

In a multi-cylinder engine having plural cylinders, the knocking control is often carried out for every cylinder, because in such an engine, knocking is easy or difficult to occur for every cylinder due to the unbalance in the intake air of the cylinders, the difference in the temperature thereof and so on. Therefore, upon application of the present invention to a multi-cylinder engine, it is of course possible to provide a different amount of angle to be delayed and a transferring time for every cylinder, whereby the switchover of an ignition timing table is made to differ in the respective cylinders.

In the case of a multi-cylinder engine, however, though a condition necessary for the switchover of an ignition timing table is seldom satisfied in all the cylinders thereof at the same time, it is preferable to simultaneously switch over ignition timing tables for all the cylinders in the point of view of protecting the engine against danger of occurrence of knocking, even if the necessary condition is satisfied in only one cylinder.

Further, as already described, time point $t_1$ after start of an engine can be set on the basis of the predetermined operational condition of the engine. In an automobile engine operated under the widely changing operation condition, however, it is sometimes impossible for the engine to uninterruptedly continue the predetermined operational condition necessary for judging the completion of warming-up of the engine.

Figures 8A, 8B, 8C:
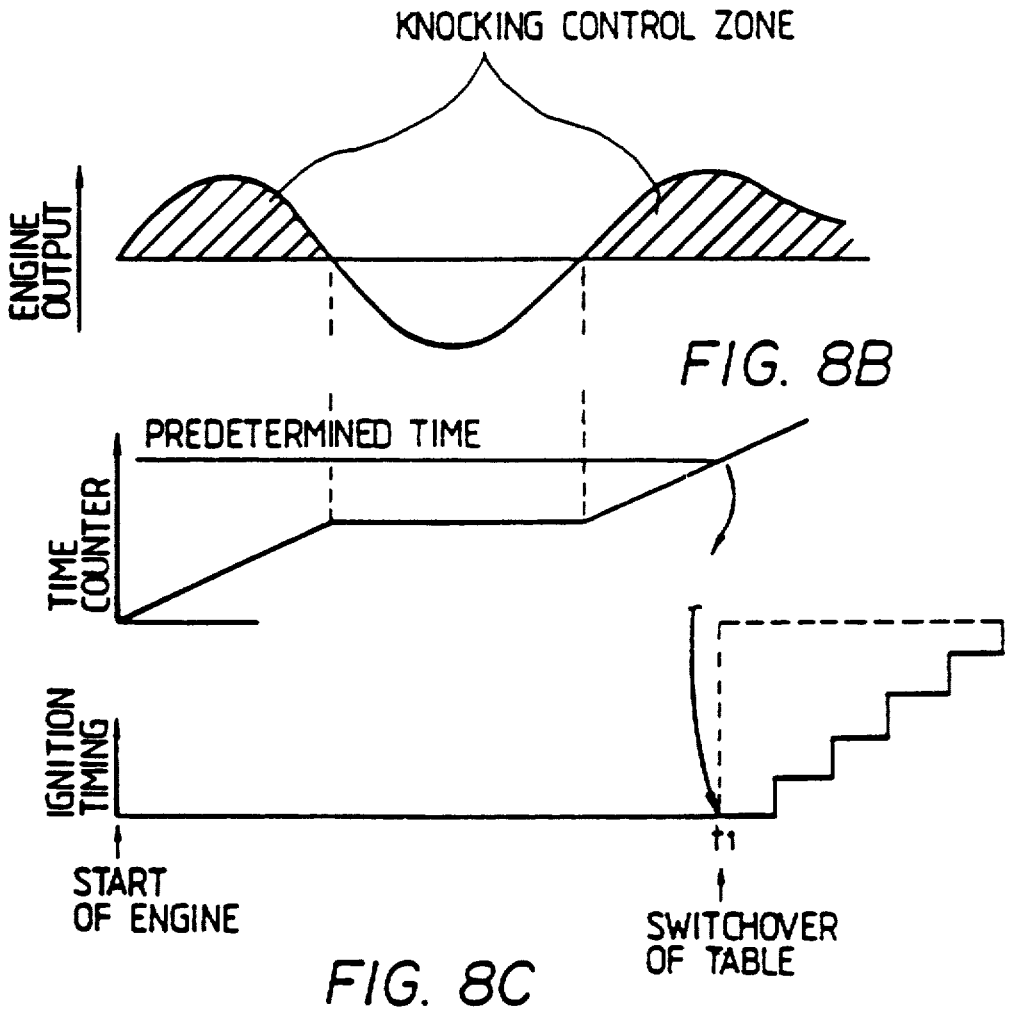
*FIGS. 8a, 8b and 8c are* drawing for explaining another example for determination of the time point of initiating the operation of switchover of an ignition timing table.

To cope with such a case there is provided a time counter for accumulating time, during which the necessary condition is satisfied, and the switchover of an ignition timing table is initiated, when the accumulated time reaches a predetermined value. Namely, as shown in FIG. 8, there can be employed the fact that the knocking control is executed only during the output of an engine exceeds a certain level (cf. hatched portions in FIG. 8). Such a duration is accumulated by the time counter, and when the counted time becomes the predetermined value, it is presumed that time point $t_1$, at which an ignition timing table should be switched over is reached.

Returning to FIG. 5, the operation of a routine for switching over an ignition timing table will be explained with reference to the flow chart.

After this routine is started, it is discriminated at steps 41 and 42 whether or not the warming-up of an engine was completed and whether or not the predetermined time ($t_1$) elapsed, respectively. In the case where the answer in both steps is negative, the processing of this routine ends. If, however, the warming-up is completed (step 41) or the predetermined time elapsed (step 42), the processing operation goes to step 43, at which it is discriminated whether or not the flag is raised.

If the flag is off, it is made on at step 44, and the switchover of an ignition timing table is initiated. At first, at step 45, the first table for providing the basic ignition timing suited for high-octane fuel is set as an ignition timing table. Then, there is obtained at step 46 the difference $D_1$ between the basic ignition timing according to the second table used until now and that according to the first table set is obtained, and the processing of this routine ends. Thereafter, the obtained difference $D_1$ is used for the ignition timing control for the switchover operation of an ignition timing table, as already described.

If the flag is on, this fact means that the first table is already set as an ignition timing table by the previous execution of this routine and under the switchover operation of an ignition timing table is now under operation. Then, it is discriminated at steps 47 and 48 whether or not the integration amount is already zero and whether or not knocking is detected, respectively. If the answer in both steps is negative, this means that the switchover operation of an ignition timing table is continued and therefore the processing of this routine ends.

If, however, the integration amount is already zero (step 47) or knocking is detected (step 48), the octane value of fuel must be judged and an ignition timing table is to be switched over accordingly (cf. FIG. 6). To this end, it is discriminated at step 49 whether or not the present ignition timing exceeds the threshold level. If the former exceeds the latter, the fuel used is judged as being of high-octane, and the first table used at that time is maintained. Thereafter, the processing of this routine ends.

On the contrary, if the present ignition timing does not exceed the threshold, the fuel used is judged as being of low-octane, and at step 50, the first table set at that time is returned to the second table for the delay angle characteristics for providing the basic ignition timing for low-octane fuel. Thereafter, the processing of this routine ends.

As described above, in accordance with the present invention, the octane value of fuel used can be judged exactly and an adaptive ignition timing table is selected accordingly. With this, the ignition timing can be changed smoothly even during the switchover of an ignition timing table and therefore an engine can produce the full performance.

We claim:

1. An ignition timing control apparatus for an internal combustion engine, comprising:

ignition unit means for supplying an ignition signal to the engine at a predetermined ignition timing;

knocking sensor means, attached to the engine, for detecting the vibration of the engine and producing a knocking detection signal indicating the degree of occurring knocking;

control unit means including a processor, which has plural tables for providing basic ignition timings and is programmed so as to execute the following steps:

selecting one of the plural tables on the basis of the knocking detection signal; and determining, in accordance with the selected ignition timing table; an actual ignition timing to be supplied for said ignition unit as the predetermined ignition timing, characterized in that the plural ignition tables includes a first ignition timing table providing a basic ignition timing for high-octane fuel and a second ignition timing table providing a basic ignition timing for low-octane fuel, and when one of the first and second ignition timing tables is switched over to the other ignition timing table, the processor included in said control unit means further executes the processing of the following steps:

setting the other ignition timing table;

obtaining a difference between the basic ignition timings according to the first and second ignition timing tables;

reducing the difference with time at a predetermined constant rate;

correcting the basic ignition timing according to the one ignition timing table by the reducing difference so that when the reducing difference becomes zero, the actual ignition timing becomes equal to the basic ignition timing according to the other ignition timing table;

comparing the reducing difference with a certain threshold provided in advance; and determining whether the one ignition timing table is to be maintained or switched over to the other ignition timing table in accordance with the comparison result of the preceding step.

2. An ignition timing control apparatus according to claim 1, characterized in that if the occurrence of knocking is detected until the reducing difference does not reach zero, a predetermined amount is added the present value of the reducing difference.

3. An ignition timing control apparatus according to claim 1, characterized in that the engine starts under the ignition timing control according to the second table.

4. An ignition timing control apparatus according to claim 3, characterized in that before said setting step, the processing executed by the processor further includes step of discriminating whether or not an operating state of the engine is of a predetermined operational condition.

5. An ignition timing control apparatus according to claim 4, characterized in that the predetermined operational condition is discriminated to be satisfied when the temperature of the engine is kept stably at a certain value.

6. An ignition timing control apparatus according to claim 5, characterized in that the predetermined operational condition is discriminated to be satisfied when a time duration elapsing from the start of the engine exceeds a predetermined value.

7. An ignition timing control apparatus according to claim 6, characterized in that the time duration is an accumulation of time durations, in which the output of the engine exceeds a predetermined level.

*8.* *An ignition timing control apparatus for controlling an ignition unit of an internal combustion engine, comprising:*

*a knocking sensor, to be attached to the engine, for detecting vibration of the engine and for producing a knocking detection signal indicating the occurrence of knocking; and*

*a control unit for generating an ignition timing signal to control said ignition unit on the basis of selected basic ignition timing values, including a processor having means for storing at least a first ignition timing table of basic ignition timing values for high-octane fuel and a second ignition timing table of basic ignition timing values for low-octane fuel, said processor being programmed to execute the following steps:*

*(a) at the time of starting of the engine, selecting said second ignition timing table to provide basic ignition timing values for generating said ignition timing signal;*

(b) *detecting a predetermined operational condition of the engine after the starting of the engine;*

(c) automatically switching from said second ignition timing table to said first ignition timing table to provide basic ignition timing values for generating said ignition timing signal upon detecting said predetermined operational condition; and (d) *determining whether to continue to generate said ignition timing signal on the basis of basic ignition timing values from said first ignition timing table or to switch back to said second ignition timing table in accordance with the receipt of a knocking detecting signal.*

*9. An ignition timing control apparatus according to claim 8, wherein said step (c) comprises:*

*(c1) obtaining a basic ignition timing value from said first ignition timing table;*

*(c2) correcting said basic ignition timing value obtained in substep (c1) by a correction amount;*

*(c3) reducing said correction amount with time at a predetermined rate;*

*(c4) repeating said substeps (c2) and (c3) until said correction amount is reduced to zero.*

*10. An ignition timing control apparatus according to claim 9, wherein said correction amount is determined from the difference between basic ignition timing values in said first and second ignition timing tables.*

*11. An ignition timing control apparatus according to claim 9, wherein said step (d) comprises:*

*(d1) detecting receipt of a knocking detection signal during substeps (c2) to (c4);*

*(d2) comparing the value of said correction amount to a predetermined threshold value; and*

*(d3) switching back to said second ignition table when the value of said correction amount does not exceed said predetermined threshold value when said knocking detection signal is received.*

*12. An ignition timing control apparatus according to claim 8, wherein said step (b) comprises:*

*(b1) detecting when the temperature of the engine reaches and remains stably at a predetermined temperature.*

*13. An ignition timing control apparatus according to claim 8, wherein said step (b) comprises:*

*(b2) detecting when a predetermined time duration has elapsed from the time of starting of the engine.*

*14. An ignition timing control apparatus according to claim 13, wherein said time duration is an accumulation of time durations during which the output of the engine exceeds a predetermined level.*

*15. An ignition timing control apparatus for controlling an ignition unit of an internal combustion engine, comprising:*

*a knocking sensor, to be attached to the engine, for detecting vibration of the engine and for producing a knocking detection signal indicating the occurrence of knocking; and*

*a control unit for generating an ignition timing signal to control said ignition unit on the basis of selected basic ignition timing values, including a processor having means for storing at least a first ignition timing table of basic ignition timing values for high-octane fuel and a second ignition timing table of basic ignition timing values for low-octane fuel, said processor being programmed too execute the following steps:*

*(a) determining from one of said first and second ignition timing tables a basic ignition timing value to be used in generating said ignition timing signal; and*

*(b) switching over from said one of said first and second ignition timing tables to the other of said first and second ignition timing tables to obtain basic ignition timing values for generating said ignition timing signal, including:*

*(b1) obtaining a basic ignition timing value from said other of said first and second ignition timing tables;*

*(b2) correcting said basic ignition timing value obtained in substep (b1) by a correction amount;*

*(b3) reducing said correction amount with time at a predetermined rate;*

*(b4) repeating said substeps (b2) and (b3) until said correction amount is reduced to zero.*

*16. An ignition timing control apparatus according to claim 15, wherein said processor is programmed to execute the following additional step:*

*(c) during the switching over performed in step (b), determining whether to continue to generate said ignition timing signal on the basis of basic ignition timing values from said other of said first and second ignition timing tables or to switch back to said one of said first and second ignition timing tables in accordance with receipt of a knocking detection signal.*

*17. An ignition timing control apparatus according to claim 16, wherein said step (c) comprises:*

*(c1) detecting receipt of a knocking detection signal during substeps (b2) to (b4);*

*(c2) comparing the value of said correction amount to a predetermined threshold value; and*

*(c3) switching back to said one of said first and second ignition tables when the value of said correction amount has a predetermined relationship to said threshold value when said knocking detection signal is received.*

*18. An ignition timing control apparatus according to claim 15, wherein said correction amount is determined from the difference between basic ignition timing values in said first and second ignition timing tables.*

* * * * *